(12) United States Patent
Gielniak et al.

(10) Patent No.: US 8,239,850 B2
(45) Date of Patent: Aug. 7, 2012

(54) COMPUTER-IMPLEMENTED METHOD OF RELEASING BATTERY STATE ESTIMATION SOFTWARE

(75) Inventors: Michael J. Gielniak, Atlanta, GA (US); Damon R. Frisch, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1270 days.

(21) Appl. No.: 11/956,370

(22) Filed: Dec. 14, 2007

(65) Prior Publication Data
US 2009/0158261 A1 Jun. 18, 2009

(51) Int. Cl.
*G06F 9/44* (2006.01)
(52) U.S. Cl. ......... 717/168; 717/126; 717/147; 717/170
(58) Field of Classification Search .......... None
See application file for complete search history.

(56) References Cited

U.S. PATENT DOCUMENTS

| | | | |
|---|---|---|---|
| 5,150,409 A * | 9/1992 | Elsner | 713/177 |
| 6,467,075 B1 * | 10/2002 | Sato et al. | 716/103 |
| 2002/0075328 A1 * | 6/2002 | Letzelter et al. | 345/854 |
| 2004/0117137 A1 * | 6/2004 | Jin et al. | 702/63 |
| 2004/0181385 A1 * | 9/2004 | Milne et al. | 703/14 |
| 2004/0268213 A1 * | 12/2004 | Chan | 715/500 |
| 2005/0065894 A1 * | 3/2005 | Inaba | 705/400 |
| 2005/0114841 A1 * | 5/2005 | Moskowitz et al. | 717/126 |
| 2005/0216378 A1 * | 9/2005 | Bickel et al. | 705/30 |
| 2006/0236083 A1 * | 10/2006 | Fritsch et al. | 713/1 |

* cited by examiner

*Primary Examiner* — Li Zhen
*Assistant Examiner* — Lenin Paulino
(74) *Attorney, Agent, or Firm* — Quinn Law Group, PLLC

(57) ABSTRACT

A computer implemented method of facilely releasing a BSE software module adapted for execution by an electronic control unit having an update model of the BSE software and a controller having an embedded desktop model of the BSE software, includes a plurality of autonomously performed steps resulting in the compiling of a plurality of c-files into a library file. A single keyword activated preferred embodiment is disclosed in a MatLab®/Simulink®/Real-Time Workshop® environment.

16 Claims, 2 Drawing Sheets

COMPUTER-IMPLEMENTED METHOD OF RELEASING BATTERY STATE ESTIMATION SOFTWARE

APPENDIX DATA

Computer program listing appendix Source Code File: autocode.m, by Michael J. Gielniak, December 2006, includes 1980 lines of code representing an implementation of a preferred embodiment of the present invention and has been submitted in duplicate on compact disc as required by 37 CFR 1.96(c)(2). The programming language is C++and is intended to run on a MS-windows-based operating system and to be executed using a MatLab® platform. This program source code is incorporated herein by reference as part of the disclosure, and is provided as source code and as a human-readable .pdf file. Each of two discs submitted contain the following files:
  Appln Appendix —autocode.m —P000933.pdf, file created Aug. 17, 2007 having a file size of 95 KB; and
  autocode.m, source code file recreated Oct. 18, 2011 from the .pdf file created Aug. 17, 2007having a file size of 65 KB.

BACKGROUND OF THE INVENTION

1. Field of the Invention

The present invention relates to systems and methods of deploying updates for a battery state estimator (BSE) software, and more particularly to a computer readable storage medium for and method of autonomously releasing a newer version of the BSE software, where an existing version and output data have been previously stored.

2. Discussion of Prior Art

Battery state estimator ("BSE") software modules have been developed to determine the state (e.g., state-of-health, state-of-charge, etc.) in order to predict the remaining life (i.e., the remaining period of viability) of a battery in use, and present the state of the art in functionality. Controllers programmably equipped with these modules are configured to sample sensor data at high rates, and subsequently extract battery parameters by utilizing model regression/fitting techniques, or taking known endpoints and assumed/interpolated trends.

As new versions of BSE modules are developed to improve the accuracy and efficiency of estimation, methods of implementing the improved or de-bugged features of the newer modules atop or in place of the existing modules and retaining the existing battery data (i.e., releasing) have also been developed. These methods while functional, typically present complex, extensive, and monotonous tasks of data analysis, validation, and code manipulation, which result in inefficient man-hour and implementation costs. In addition to expenditures relating to preparation and set-up, these manually performed algorithms and processes are prone to human error. For example, it is known in the art for engineers and technicians to have to re-release BSE software multiple times, in order to achieve a properly functioning update without errors.

As dependency upon battery power increases, so too does the need for updated and dependable battery life prediction. This, in turn, maintains a need in the art for an efficient yet reliable method of releasing new versions of battery state estimation software.

BRIEF SUMMARY OF THE INVENTION

Responsive to this need, the present invention concerns an autonomously performed process and method of releasing battery state estimator software (or the like) that replaces prior art manual code development and integration processes. The benefits of this invention include minimizing human error, and providing a streamlined, repeatable, precise, and autonomous procedure executable by source code. This makes the present invention more robust from release to release, then prior art methodology, and obviates much of the need for re-releasing software due to integration errors. As a result, the time for integrating BSE releases to suppliers and other third parties is reduced from approximately 6 hours (on average) to 30 seconds or less. This frees up time for integration engineers to make more releases, more quickly, and support more programs (and other activities), more efficiently.

The invention generally concerns a computer-implemented method of releasing BSE software comprising initial steps of communicatively coupling a controller having an embedded desktop model of a BSE software and an electronic control unit (ECU) having an update model of the BSE software, and activating the method by entering a keyword. Alternatively, it is appreciated that the updated software and inventive algorithm may be stored and/or executed upon the controller directly during the release process, so that a separate ECU is not necessary. The desktop and update models are compared, so as to determine the difference therebetween and the necessary changes to be made based on the difference. The desktop model is run through conversion software using a standard target file so as to convert the model into c-files. Next, code is added to the c-files so that certain BSE variables are mapped to particular regions in the controller, and the c-files are compiled, linked, and built into a new desktop executable. The new desktop executable and the embedded desktop models are then run through a validation suite, and their outputs are compared to determine errors. Finally, the c-files are built into a library file and the library file is released, if no errors are detected.

Other aspects and advantages of the present invention, including preferred code segments for electronically executing the method within a MatLab®/Simulink®/Real-Time Workshop® environment will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein.

DETAILED DESCRIPTION OF THE INVENTION

The present invention concerns a computer readable storage medium configured for and a method (i.e., process) of facilely releasing updates to a battery state estimator (BSE) and BSE development activities/tools/procedures software (or the like) by a user. In a preferred embodiment, the method is executable by at least one electronic control unit 10, such as a desktop PC, vehicle CPU, laptop computer (FIG. 1), or PDA. The unit 10 is communicatively coupled to a controller 12 that comprises an existing model (i.e., version) of the software. More preferably, the inventive method can be executed solely on a desktop PC comprising and configured to compare the two BSE software versions, neither of which having necessarily been built into an embedded model. Thus, it is not necessary for the BSE software versions to be stored and functionally executable upon hardware (i.e., the unit 10 and/or controller 12), in executing the method.

Figure 1:
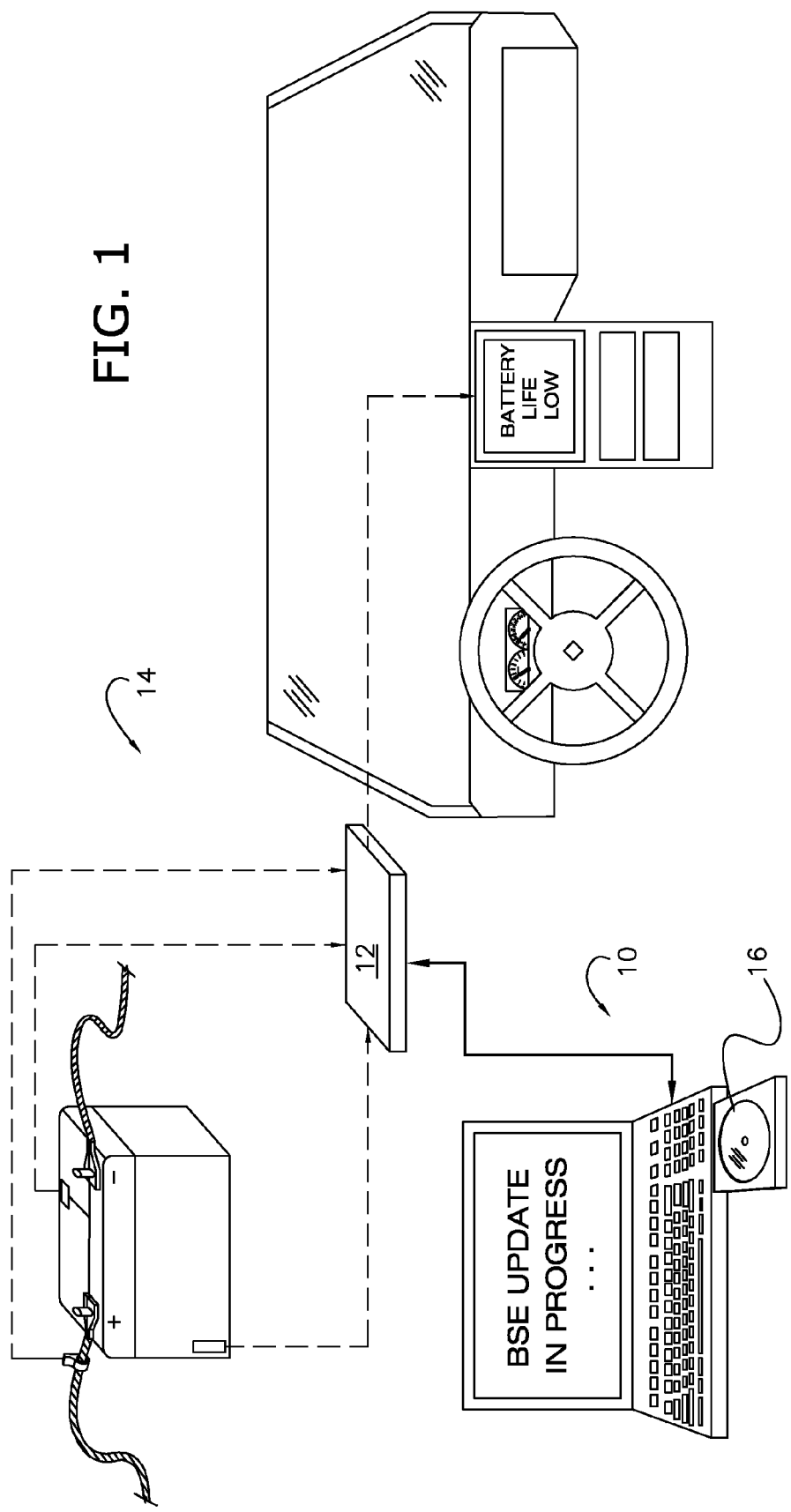
FIG. 1 is a perspective view of a battery state estimation system including a controller and an electronic control unit configured to perform a method of releasing the BSE software stored on the controller, in accordance with a preferred embodiment of the invention.

It is known in the art, however, for the controller 12 to be communicatively coupled to and configured to solicit data and extract battery parameters from various battery sensors (e.g., current, voltage, and temperature sensors), as part of a BSE system 14, schematically shown in FIG. 1. The inventive method is further described and illustrated herein with respect to vehicular battery usage as shown in FIG. 1; however, it is appreciated that the benefits and advantages of the invention may be utilized with the release of BSE modules servicing other devices, such as smart devices, laptops, and other portable electronic/digital devices.

I. General Configuration and Function

Figure 2:
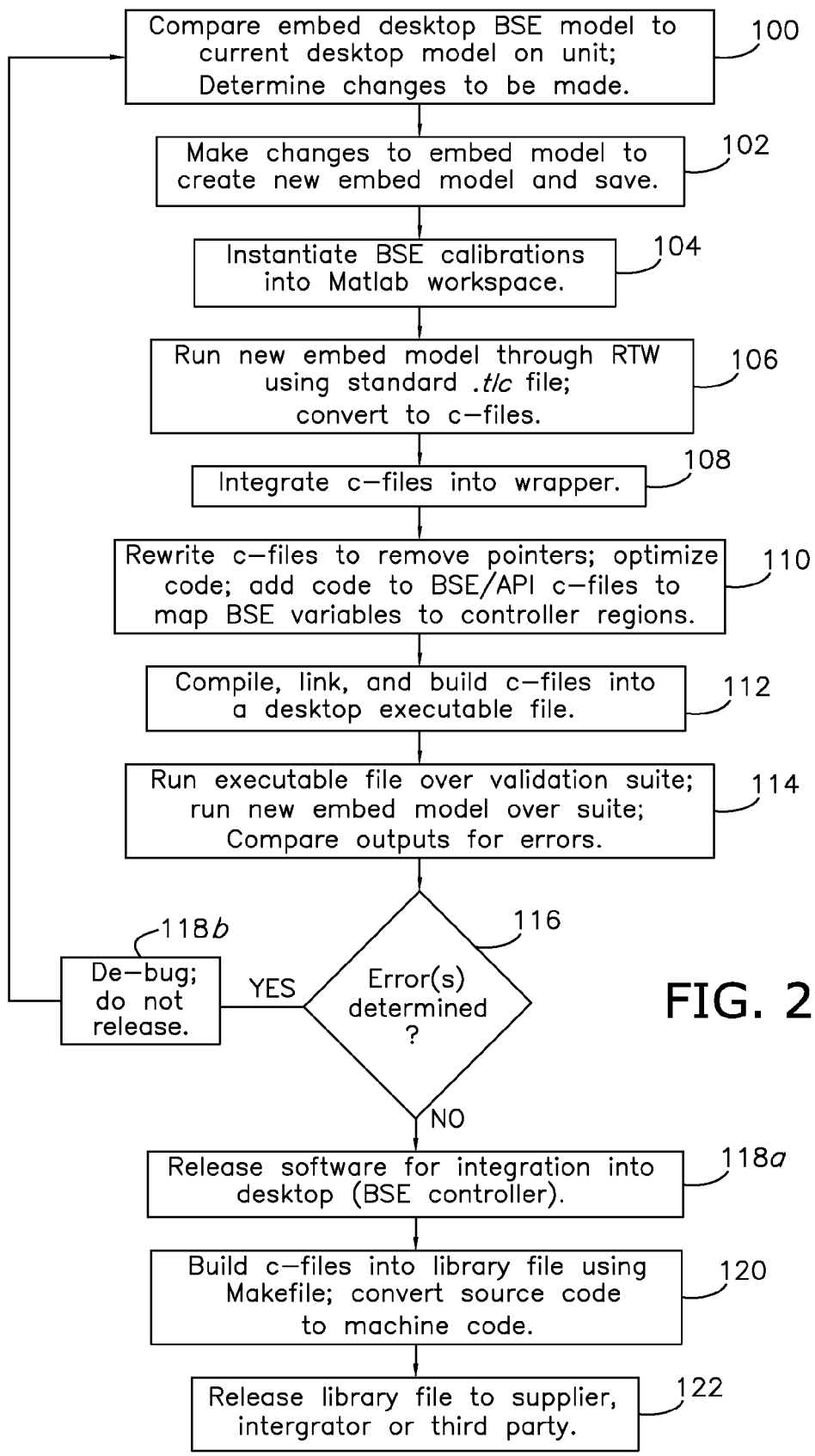
FIG. 2 is a flow chart of a method of releasing BSE software including multiple autonomously performed steps, wherein each step presents a computer-implemented component, in accordance with a preferred embodiment of the invention.

The method, as presented by source code, is electronically programmed and stored upon a computer readable storage medium 16 (FIG. 1) communicatively coupled to the unit 10 or, more preferably, the unit 10 itself. As is further described herein, processing of the code produces an executable file that operates upon a suitable modeling platform, such as Matlab®, Simulink®, and Real-Time Workshop® versions 14.0, 4.0, and 6.0 respectively. Other aspects of the storage space, programming code requirements, and processing capacity necessary for proper execution are readily determinable by those of ordinary skill in the art, and as such, will not be further described herein except with respect to the aft described preferred source code embodiment. A preferred method in accordance with the present invention is shown in and includes the generally descriptive steps 100-122 of FIG. 2.

At an initial diagnostic step 100, the unit 10 autonomously compares the release of the desktop Simulink® model embedded upon the controller 12 with a current release of the desktop Simulink® model on the unit 10, so as to determine the difference therebetween. Again, however, the comparison can be between the two software versions directly, wherein neither has been run on hardware, thereby obviating the requirement of reading RAM or EEPROM from the controller 12. Determining the difference autonomously establishes the needed changes for the BSE software release, which streamlines and substantially reduces the likelihood of errors during the process. The diagnostic step 100 is critical because if a change is missed, the BSE will not work as it does on the laptop, will induce system performance errors, and will require a subsequent release (or releases) to fix the errors.

At step 102, the embedded version of the BSE model is opened in order to make the needed changes, so as to produce a new embedded version. At this step, Simulink® blocks that will cause Real-Time Workshop® (RTW) to fail the build process are removed and/or recoded. The new embedded version of the BSE for processing through RTW is then saved. At a step 104, all requisite and correct BSE calibrations are instantiated into the MatLab workspace so as to be visible to RTW. All of the above occurs with no user interaction beyond specification of the model to convert.

Next, at a step 106, the new embedded version of the BSE is ran through RTW utilizing a standard target language compiler (.tlc) file. At this step, it is appreciated that RTW converts the MatLab®/Simulink® model into c-files (i.e., C and/or C++ files) that are needed for the BSE release. At a step 108, the c-files are integrated into a "wrapper" (Application Programming Interface, API), wherein other c-files needed for BSE release have been pre-loaded. The intent of the wrapper is to control interfacing between the releasing unit 10 and the BSE controller 12.

At step 110, the c-files are rewritten to remove pointers, as it is appreciated that pointers cause aberrant/unstable unit operation in embedded operating systems. Also at this step, code optimization is performed to improve throughput and minimize memory demands during the releasing process. It is at this point that certain BSE variables are mapped to particular regions in the controller memory by addition of code to the BSE and API c-files. Once the c-files have been rewritten, they are compiled, linked, and built into both a set of object files that can reside within the controller 12 and an executable that can be run on a desktop-PC, at step 112.

At a step 114, the desktop executable of the embedded model is run in a simulation over a pre-loaded validation suite providing variant initialization variables as required for each simulation of the release code. The MatLab®/Simulink® desktop model is also opened, initialized, and ran over the validation suite. At step 116, the outputs of the modified embedded BSE and MatLab®/Simulink® models are then compared to ensure that recoding and conversion of the embedded model did not induce errors. If no errors are discovered, then at step 118a, the software is released for integration into the controller 12. If errors are discovered, then at a step 118b the desktop BSE is debugged by returning to step 100 until no errors are detected at step 116.

Next, at step 120, the c-files are built into a library file using a compiler and more preferably "Makefile" technology. At this step, it is appreciated that the compiler (not shown) converts the source code into finalized machine code for execution by the controller processor (also not shown). Lastly, at a step 122, the BSE software is released to a supplier/integrator or third party as a library file.

A novel aspect of the invention involves these steps being implemented as autonomously functioning segment codes, once the user has activated the executable file. The preferred method presents single click or keyword activation in contrast to the afore-described complex manual prior art methods of releasing updates. For example, the user may need only type the command "autocode" into the MatLab® workspace, press enter, and browse through to select one of a few model and calibration file types, in order to execute the source code and release the library file.

II. Detailed Source Code Description and Analysis

More particularly, a preferred embodiment of the present invention includes source code to read the desktop version of the BSE software, strip out content that will not autocode, replace that content with new content which will, save the desktop version with the new content, and produce the autocoded c-files therefrom, automatically. The preferred code will be further described herein with respect to a MatLab®/Simulink®/Real-Time Workshop® environment, and as such will utilize indigenous terminology and command terms including certain data values and parameters that are indicated by compound words formed with no space between the words as is customary in that art.

The preferred source code, submitted in Appendix and incorporated by reference herein, presents a plurality of code segments, including, but not limited to, those listed below. An initial segment presents a plurality of assumptions to be realized by MatLab®, Simulink®, and Real-Time Workspace®. For example, with further respect to steps 102 and 104, it is assumed that only those To Workspace blocks whose variable name does not begin with the three characters "VeB" will be stripped completely out of the model prior to autobuild. Also, all constant blocks in the top-most level of the embedded model preceded by "VeB" will be stripped from the model replaced with "Inports;" these Inports (i.e., signal subsystem inputs) will be named with their corresponding model values.

It is assumed that the input variables v, i, and t are "FromWorkspace" blocks, and will also be replaced by Inports, which are named according to the variables as defined below:

vname='VeBSEC_U_HB_BattVoltage';

iname='VeBSEC_I_HB_BattCurrent'; and tname='VeBSEC_T_HB_BattTemp'.

It is further assumed that the clock block will be replaced by an Inport, which is named according to the variable "clockname" as defined below:

clockname='VeBSEC_t_Time'.

The preferred simulation has only one clock block.

In yet another exemplary assumption, it is assumed that all EEPROM variables, which begin with "NeB", will be replaced with memory reads, and a data store memory is instantiated into the workspace. It is appreciated that EEPROM variables must be tied to a first level subsystem Outport, just below "BSE" (because of BSE current valid enable). Only those variables stipulated in DoNOTCreateMemWriteBlock will not have write memory blocks instantiated, wherein DoNOTCreateMemWriteBlock={'NeBSEC_T_TOld', 'NeBSEC_U_VoOld'}. The functionality of "DoNOTCreateMemWriteBlock" allows the inventive process the flexibility of excluding flash variables in the build. It is appreciated that "VeB" indicates a volatile-element that interfaces to the battery (i.e. a battery input) and "NeB" indicates a non-volatile-element that interfaces to the battery.

All I/O signals running to or from top level BSE blocks will have "signal name must resolve to Simulink® signal object" checked. EEPROM variable names must have meaningful character strings between the final underscore in the name and the last three characters. Otherwise, data store writes cannot be automatically assigned to those variables. All EEPROM variables in the desktop model that are to be associated to data store write blocks, must either have Outports to the bsecmbse_desk root (top-level) Simulink® system or must have terminator blocks located in the \filename\BSE\subsystem, named with the appropriate name, xxxxx, wherein xxxxx=the characters between the final underscore in NeBSEC* to the end of the NeBSEC* string. For example, NeBSEC_HB_Aold must be terminated with a terminator block named A if it is not a global output of the BSE subsystem. This terminator block must be connected to the output that is to be written to EEPROM for the associated Ne* variable. It is appreciated that the expression matching used here is associative with a particular Powertrain standard naming convention and therefore is the avenue by which the automated software knows how and what to find and replace.

It is further appreciated that use of this script requires installation of a suitable (e.g., GNU Dev) C++ compiler at a pre-defined location (e.g. "c:\Dev-Cpp\") so the operating system knows how to compile the project 12. It is also appreciated that the preferred script assumes a BSE execution rate for comparison of the .exe file output with the desktop model, and that if the BSE execution rate changes, then the time vector in the comparison section should also be modified.

Finally, the script pcf.m should be in the "<MATLAB ROOT>/work" directory or otherwise in the MATLAB defined path so that the script may be called without error.

The preferred code also includes a plurality of instruction segments for autonomously performing the method by the unit 10 and to provide the user with information. In the preferred embodiment, for example, instructions for executing the method may include making required changes to autocode.m, directory names, v, i, t, clock names, and API .c and .h files in the wrapped directory; ensuring that a directory called "wrapped" exists in the same directory as the desktop model and has in it files bse_vit.txt (including data for comparison), test_out.txt (data save location), Powertrain c-files (e.g., exp, log, rsc, sqt, mutl, lookup, fltrm, etc., which define functions for on-controller execution of standard high-level math and lookup operations), bse_api.c, bse_api.h, main_ForFileInput.c, and any other .h or .c file that is associated with the wrapper.

Further preferred instruction includes opening the desktop model with the correct version of Matlab® and ensuring that the Simulation>Configuration parameters point to the right .tlc embedded coder file, and making sure that EEPROM variables that do not have ToWorkspace blocks defined in the top-level of the BSE hierarchy have terminator blocks assigned to them in the 2nd-level of the hierarchy (bsecmbse_desk/BSE) attached to the signal that are to be written to the EEPROM. Finally, a later instruction directs the user to perform an activating action, such as for example, typing the term "autocode" in the MATLAB command window to execute the method. Again, an inventive aspect of the method is that once properly configured, the user need only type a single command or perform a single act to perform a complete and accurate release.

The preferred source code includes a plurality of segments for performing steps relating to preparation, environment, and actual performance of the method. For example, with respect to steps 100 through 104, segment codes are preferably provided for checking for the prior existence of a wrapped directory; retrieving and updating block names, model signals, and object handles; replacing ToWorkspace blocks in the main system level with Outports; changing all FromWorkspace blocks to Inports except those with the name of Ne*, Ke*, Kt* or any numerical value; locating the clock block and changing it to an Inport; finding the EEPROM constants and replacing them with data store read writes; looping through all signals and deleting any that end at a ToWorkspace block, and then resetting the signal list to compensate for those deleted; setting the top-level BSE Inport signals for resolution; retrieving the Outports in the BSE (desktop model) and comparing the characters from last underscore to length-3 in DSR to backslash ("/") to end in bseoutports in order to determine which Outports to connect the DSWs to, wherein the script is allowed to trace only those Outports existing in the main level of the subsystem, and the length-3 results in skipping over EEPROM use of the term "old" (for example, NeBSEC_x_ABC could be a possible BSE output signal name and the corresponding EEPROM variable should be named NeBSEC_x_ABCold; hence only the signal name is compared); and writing (non-sentinel) data store writes in BSE subsystem.

With respect to steps 106 through 120, the preferred source code further includes code segments for modifying the configuration parameters for autocoding; rewriting the c-files so that they will autocode with the wrapper directly; modifying bse_cmbse.c and writing it back to a c-file; modifying bse_cmbse.h and writing it back to a c-file; modifying bse_ckbse.h and writing it back to a c-file; modifying bse_ckbse.c and writing it back to a c-file; modifying bse_cnbse.h and writing it back to a c-file; modifying bse_cnbse.c and writing it back to a c-file; updating and modifying main_ForFileInput.c; creating an executable file; and running a comparison of the executable file with the desktop model utilizing an Excel® spreadsheet, so as to determine errors; and compiling a library file for releasing, if no errors are determined.

The preferred forms of the invention described above are to be used as illustration only, and should not be utilized in a limiting sense in interpreting the scope of the general inventive concept. Obvious modifications to the exemplary embodiments and methods of operation, as set forth herein, could be readily made by those skilled in the art without departing from the spirit of the present invention. The inventor hereby states his intent to rely on the Doctrine of Equivalents to determine and assess the reasonably fair scope of the present invention as pertains to any system or method not materially departing from but outside the literal scope of the invention as set forth in the following claims.

What is claimed is:

1. A computer-implemented method of releasing battery state estimation (BSE) software comprising the steps of:
   a. communicatively coupling a controller having an embedded desktop model of a BSE software and an electronic control unit having an update model of the BSE software, wherein the update model of the BSE software includes new content;
   b. comparing the desktop and update models so as to determine the difference therebetween resulting from the new content, and the necessary changes to be made based on the difference, wherein comparing the desktop and update models includes assuming a BSE execution rate, monitoring the actual BSE execution rate, and modifying a time vector during comparison if the rate changes;
   c. running the desktop model through a simulation using a standard target file so as to convert the desktop model into one or more c-files;
   d. adding code to the one or more c-files so that certain BSE variables are mapped to particular regions in the controller;
   e. compiling, linking and building the one or more c-files into a new desktop executable;
   f. running the new desktop executable and the embedded desktop model through a validation suite and comparing their outputs to determine errors; and
   g. building the one or more c-files into a library file and releasing the library file, if no errors are detected.

2. The method as claimed in claim 1, wherein step a) further includes the step of activating the method by entering a keyword, and steps b) through g) are performed autonomously by the electronic control unit and controller, when the method has been activated.

3. The method as claimed in claim 1, wherein step b) further includes the steps of rewriting predetermined c-files to remove pointers.

4. The method as claimed in claim 1, wherein step f) further includes the steps of comparing their outputs using an Excel® spreadsheet.

5. The method as claimed in claim 1, wherein steps c) through f) further include the steps of confirming the presence of a wrapped directory, reviewing the wrapped directory, and confirming the presence of requisite files therein.

6. The method as claimed in claim 1, wherein step c) further includes the steps of stripping the desktop model of content, so as to enable the conversion into c-files.

7. The method as claimed in claim 1, wherein the method is configured, compiled, and executed on a modeling platform comprising MatLab®, Simulink®, and Real-Time Workshop®.

8. The method as claimed in claim 7, wherein step c) further includes the steps of opening and modifying the desktop model so as to be executable and visible by Real-Time Workshop®.

9. The method as claimed in claim 7, wherein steps b) through f) further includes the steps of stripping the model of identified ToWorkspace blocks, and replacing a portion of the blocks with Outports.

10. The method as claimed in claim 7, wherein steps b) through f) further includes the steps of replacing a portion of FromWorkspace blocks with Inports.

11. The method as claimed in claim 7, wherein steps b) through f) further includes the steps of replacing identified EEPROM variables with memory read writes.

12. The method as claimed in claim 7, wherein steps b) through f) further include the steps of deleting signals that end at a ToWorkspace block, and resetting a signal list.

13. The method as claimed in claim 7, wherein steps b) through f) further include the steps of modifying a plurality of files and writing them back to a respective c-file.

14. The method as claimed in claim 1, wherein a desktop PC constitutes both the controller and the unit.

15. A computer-implemented method of releasing battery state estimation (BSE) software, the method comprising the steps of:
   a. communicatively coupling a controller having an embedded desktop model of a BSE software and an electronic control unit having an update model of the BSE software, wherein the desktop model is a current version and the update model is a release version, and activating the method by entering a keyword;
   b. comparing the desktop and update models so as to determine a difference between the release version and the current version and the necessary changes to be made based on the difference by assuming a BSE execution rate, monitoring the actual BSE execution rate, and modifying a time vector during comparison if the rate changes;
   c. stripping content from the desktop model and running the desktop model through a simulation using a standard target file so as to convert the model into c-files;
   d. adding code to the c-files so that certain BSE variables are mapped to particular regions in the controller;
   e. compiling, linking and building the c-files into a new desktop executable;
   f. running the new desktop executable and the embedded desktop model through a validation suite and comparing their outputs using an Excel® spreadsheet to determine errors; and
   g. building the c-files into a library file using Makefile technology and releasing the library file, if no errors are detected.

16. A non-transitory computer readable storage medium containing instructions for autonomously releasing battery state estimation (BSE) software, and adapted for execution by an electronic control unit having an update model of a BSE software and communicatively coupled to a controller having an embedded desktop model of the BSE software, said medium comprising:
   computer code for comparing the embedded desktop model and the update model, wherein the update model includes new content, so as to determine the difference therebetween resulting from the new content and the necessary changes to be made based on the difference;

wherein said computer code for comparing the desktop and update models includes computer code for assuming a BSE execution rate, monitoring the actual BSE execution rate, and modifying a time vector during comparison if the rate changes;

computer code for running the desktop model through a simulation using a standard target file so as to convert the model into c-files;

computer code for adding code to the c-files so that certain BSE variables are mapped to particular regions in the controller;

computer code for compiling, linking and building the c-files into a new desktop executable;

computer code for running the new desktop executable and the embedded desktop model through a validation suite, and comparing their outputs to determine any errors;

computer code for confirming the presence of a wrapped directory, reviewing the wrapped directory, and confirming the presence of requisite files therein; and computer code for building the c-files into a library file and releasing the library file, if no errors are detected.

* * * * *